US010944292B2

(12) United States Patent
Yoshida et al.

(10) Patent No.: US 10,944,292 B2
(45) Date of Patent: Mar. 9, 2021

(54) WIRELESS POWER SUPPLY DEVICE

(71) Applicant: NEC CORPORATION, Tokyo (JP)

(72) Inventors: Shuhei Yoshida, Tokyo (JP); Masahiro Tanomura, Tokyo (JP); Hiromitsu Tahara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 51 days.

(21) Appl. No.: 16/331,029

(22) PCT Filed: Sep. 11, 2017

(86) PCT No.: PCT/JP2017/032616
§ 371 (c)(1),
(2) Date: Mar. 6, 2019

(87) PCT Pub. No.: WO2018/051934
PCT Pub. Date: Mar. 22, 2018

(65) Prior Publication Data
US 2019/0207428 A1 Jul. 4, 2019

(30) Foreign Application Priority Data
Sep. 14, 2016 (JP) .............................. JP2016-179899

(51) Int. Cl.
*H02J 50/12* (2016.01)
*H01F 38/14* (2006.01)
(Continued)

(52) U.S. Cl.
CPC .............. *H02J 50/12* (2016.02); *B60L 53/12* (2019.02); *B63G 8/001* (2013.01);
(Continued)

(58) Field of Classification Search
CPC ....... H02J 50/12; H02J 50/40; B60L 2200/32; B60L 53/12; H01F 38/14; H01F 27/2804; B63G 8/001
See application file for complete search history.

(56) References Cited

U.S. PATENT DOCUMENTS

2011/0133569 A1* 6/2011 Cheon ..................... H02J 50/90
307/104
2012/0206239 A1* 8/2012 Ikemoto ............... H05K 999/99
340/10.1
(Continued)

FOREIGN PATENT DOCUMENTS

JP 2002-305121 A 10/2002
JP 2010-523030 A 7/2010
(Continued)

OTHER PUBLICATIONS

Written Opinion of PCT/JP2017/032616 dated Oct. 10, 2017 [PCT/ISA/237].
(Continued)

*Primary Examiner* — Jared Fureman
*Assistant Examiner* — Duc M Pham
(74) *Attorney, Agent, or Firm* — Sughrue Mion, PLLC

(57) ABSTRACT

In order to reduce a power transmission antenna and power receiving antenna of a wireless power supply device for supplying power underwater to a size suitable for an underwater mobile body and sensor, this underwater wireless power supply device 101 wirelessly transmits energy by resonating at a frequency determined by the impedance of a power transmission antenna 103 that transmits energy wirelessly in a good conductor medium 102, the impedance of a power receiving antenna 104 which receives energy transmitted from the power transmission antenna 103, and the impedance of the good conductor medium 102. The power transmission antenna 103 and the power receiving antenna
(Continued)

104 have the multiple antenna coils 105, 106, and at least one dielectric 107, 108 arranged between the multiple antenna coils 105, 106, and the multiple antenna coils 105, 106 each has multiple laminated coils 109.

6 Claims, 7 Drawing Sheets

(51) Int. Cl.
  *H02J 50/40* (2016.01)
  *H01F 27/28* (2006.01)
  *B60L 53/12* (2019.01)
  *B63G 8/00* (2006.01)

(52) U.S. Cl.
  CPC ......... *H01F 27/2804* (2013.01); *H01F 38/14* (2013.01); *H02J 50/40* (2016.02); *B60L 2200/32* (2013.01)

(56) References Cited

U.S. PATENT DOCUMENTS

| | | | | |
|---|---|---|---|---|
| 2014/0145816 | A1* | 5/2014 | Sato | H01F 17/0013 336/208 |
| 2015/0311880 | A1* | 10/2015 | Yoshida | H03H 7/38 307/104 |

FOREIGN PATENT DOCUMENTS

| | | |
|---|---|---|
| JP | 2012-190882 A | 10/2012 |
| JP | 2014-023324 A | 2/2014 |
| JP | 2014-193057 A | 10/2014 |
| WO | 2013/145019 A1 | 10/2013 |
| WO | 2014/034491 A1 | 3/2014 |
| WO | 2014/073207 A1 | 5/2014 |
| WO | 2014/119085 A1 | 8/2014 |
| WO | 2014/129531 A1 | 8/2014 |
| WO | 2015/129247 A1 | 9/2015 |

OTHER PUBLICATIONS

International Search Report of PCT/JP2017/032616 dated Oct. 10, 2017 [PCT/ISA/210].

Communication dated May 19, 2020 from Japanese Patent Office in JP Application No. 2016-179899.

Communication dated Aug. 11, 2020, from the Japanese Patent Office in Application No. 2016-179899.

H. Fukuda et al, "New Concept of an Electromagnetic Usage for Contactless Communication and Power Transmission in the Ocean", 2013 IEEE International Underwater Technology Symposium, IEEE, pp. 1-4, Mar. 8, 2013.

* cited by examiner

Fig.7

| | CONDUCTIVITY (S/m) | RELATIVE PERMITTIVITY |
|---|---|---|
| SEA WATER | ABOUT 4 | ABOUT 81 |
| RIVER WATER | ABOUT $10^{-2} \sim 10^{-1}$ | ABOUT 81 |
| FRESHWATER, TAP WATER | ABOUT $10^{-3} \sim 10^{-2}$ | ABOUT 81 |
| SOIL (MOIST) | ABOUT $10^{-2} \sim 10^{-1}$ | ABOUT 3~6 |
| CONCRETE | ABOUT $10^{-3} \sim 10^{-2}$ | ABOUT 5~10 |
| SOIL (DRY) | ABOUT $10^{-4} \sim 10^{-3}$ | ABOUT 3~6 |
| *AIR | 0 | ABOUT 1 |

WIRELESS POWER SUPPLY DEVICE

CROSS REFERENCE TO RELATED APPLICATIONS

This application is a National Stage of International Application No. PCT/JP2017/032616, filed Sep. 11, 2017, claiming priority to Japanese Patent Application No. 2016-179899, filed Sep. 14, 2016, the contents of all of which are incorporated herein by reference in their entirety.

TECHNICAL FIELD

The present invention relates to a wireless power supply device.

BACKGROUND ART

Patent Literatures 1 and 2 disclose a technology in which energy is wirelessly transmitted in a medium, like seawater, etc. In the technology, a power transmission antenna which transmits energy and a power receiving antenna which receives energy are composed of a coil in which a conducting wire is wound plural turns. When alternating power is applied to the coil of the power transmission antenna, a magnetic field passing through the coil is generated. When the magnetic field passes through the coil of the power receiving antenna, an induced current is generated in the coil of the power receiving antenna, and electric power is supplied.

In the technology, however, a distance between the power transmission antenna and the power receiving antenna has to be about 2 cm or shorter. Therefore the power transmission antenna has to be accurately positioned with a mobile body or a sensor which is operated underwater. Farther, if a creature adheres to the antenna, it is hard to obtain desired characteristics for power supply. In such situation, it is hard to stably supply power.

If it is possible to supply power with the distance of 5 cm or longer between the power transmission antenna and the power receiving antenna, positioning accuracy of the mobile body which is operated underwater and restriction due to creature adhesion are greatly eased.

The reason why good efficiency for power supply is not obtained underwater in the above related technology is as described below. Since seawater has a conductivity higher than that of air, etc., an eddy current or a diffusion current occurs and loss is generated when a magnetic field and an electric field (electromagnetic field) pass through seawater. Here, a conductivity of air is 0, and a relative permittivity thereof is about 1. A conductivity of seawater is about 4 S/m.

Patent Literatures 3 and 4 disclose related technologies on loss reduction of an electromagnetic field. In the power transmission system disclosed in Patent Literature 3, the power transmission device outputs power through the power transmission antenna at the frequency which is determined by impedance adjustment between an impedance of a good conductor medium and a variable capacitance and a variable inductor of the power transmission antenna of the power transmission device, and impedance adjustment between a variable capacitance and a variable inductor of the power receiving antenna of the power receiving device. The power receiving device receives electric power outputted by the power transmission device through the power receiving antenna.

Patent Literature 4 discloses the insulation transmission device in which electromagnetic energy is transmitted between a first circuit and a second circuit. The insulation transmission device includes a first resonator and a second resonator which are connected to the first circuit and the second circuit, respectively. The first resonator and the second resonator are made by conductors in a dielectric multilayer substrate including a plurality of dielectric layers as a first conductor group and a second conductor group, respectively. The first conductor group and the second conductor group are covered by a dielectric and separated from each other.

CITATION LIST

Patent Literature

[PTL 1] Japanese Unexamined Patent Application Publication No. 2002-305121
[PTL 2] Japanese Translation of PCT International Application Publication No. 2010-523030
[PTL 3] Japanese Unexamined Patent Application Publication No. 2014-193057
[PTL 4] PCT International Publication No. WO/2013/145019

SUMMARY OF INVENTION

Technical Problem

The inventor has studied a method for reducing loss of an electromagnetic field which pass through seawater having a high conductivity, and found that attenuation of the electromagnetic field passing through seawater is proportional to the following formula, $$\exp\left(\frac{-2d}{\sqrt{\pi f \mu \sigma}}\right) \quad (1)$$

where d is a distance between the power transmission antenna and the power receiving antenna, f is a frequency, $\mu$ is a permeability of seawater, and $\sigma$ is an electric conductivity of seawater.

FIG. 8 is a graph illustrating a relation between a frequency and an attenuation factor of an electric field which propagates in seawater. As shown in FIG. 8, an antenna which operates at a low frequency lower than 100 KHz is required in order to obtain sufficient transmission efficiency when a distance between the power transmission antenna and the power receiving antenna which 2.5 are located underwater is 5 cm or longer.

However, tradeoff between an operation frequency of an antenna and an antenna size exists. If the power transmission antenna and the power receiving antenna are located underwater, the distance therebetween is 5 cm or longer, and power supply between the antennas is carried out with practical power supply efficiency of several ten percent or more, it is hard to reduce the power transmission antenna and the power receiving antenna to a size suitable for a mobile body or a sensor which is located underwater. Patent Literatures 3 and 4 do not disclose a technology solving the problem.

An object of the invention is to provide a technology in which a power transmission antenna and a power receiving antenna of a wireless power supply device supplying power underwater can be reduced to a size suitable for a mobile body or a sensor located underwater.

Solution to Problem

The wireless power supply device of the invention wirelessly transmits energy by resonating at a frequency determined by an impedance of a power transmission antenna which wirelessly transmits energy in a medium, an impedance of a power receiving antenna which receives energy transmitted from the power transmission antenna and an impedance of the medium. The power transmission antenna and the power receiving antenna include a resonance antenna unit having a plurality of antenna coils and at least one dielectric arranged between the plurality of antenna coils. Each of the plurality of antenna coils includes a plurality of laminated coils.

Advantageous Effect of Invention

In the invention, it becomes possible to reduce the power transmission antenna and the power receiving antenna of the wireless power supply device which supplies power underwater to a size suitable for a mobile body or a sensor located underwater.

BRIEF DESCRIPTION OF DRAWINGS

FIG. 7 is a table illustrating conductivities and relative permittivities of various media related to the invention.

EXAMPLE EMBODIMENT

A wireless power supply device in an example embodiment of the invention is described below by referring to drawings. In the following example embodiments, seawater is described as an example of a good conductor medium. However the invention is not limited to the example. FIG. 7 is a table illustrating conductivities and relative permittivities of various media related to the invention. The good conductivity medium of the invention may be a substance having a conductivity of $1 \times 10^{-4}$ S/m or larger and a relative permittivity larger than 1, like river water, fresh water, tap water, soil, and concrete.

First Example Embodiment

Figure 1:
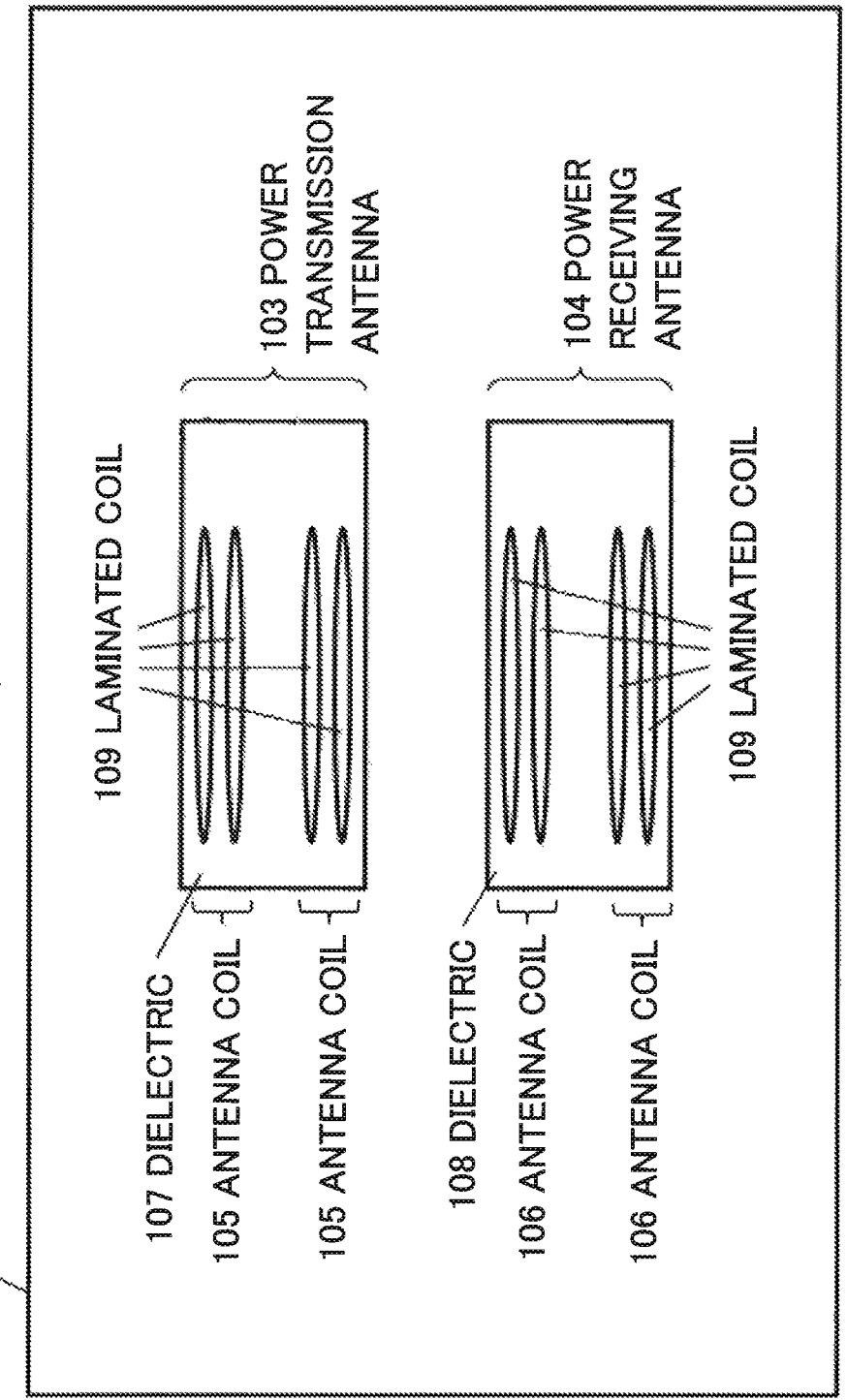
FIG. 1 is a diagram illustrating a structure of a wireless power supply device of a first example embodiment.

A wireless power supply device of a first example embodiment of the invention is described below by referring to drawings. FIG. 1 is a diagram illustrating a structure of the wireless power supply device of the first example embodiment.

As shown in FIG. 1, an underwater wireless power supply device 101 includes a power transmission antenna 103 and a power receiving antenna 104. The power transmission antenna 103 and the power receiving antenna 104 are located in a good conductivity medium 102, e.g. seawater, etc. The power transmission antenna 103 wirelessly transmits energy in the good conductivity medium 102. The power receiving antenna 104 receives the energy transmitted from the power transmission antenna 103. The underwater wireless power supply device 101 resonates at the frequency determined by an impedance of the power transmission antenna 103, an impedance of the power receiving antenna 104 and an impedance of the good conductivity medium 102, and wirelessly transmits energy. An operation in which energy is wirelessly transmitted is described below as a power transmission operation.

The power transmission antenna 103 includes an antenna coil 105 and a dielectric 107. The power receiving antenna 104 includes an antenna coil 106 and a dielectric 108.

The antenna coils 105 and 106 are composed of a plurality of laminated coils 109. The laminated coil 109 is a coil in which a conductor, e.g. copper wire, is wound plural turns. The laminated coil 109 is generally a helical coil, a spiral coil, or the like. In the example embodiment, the laminated coil 109 is not limited to the above mentioned. Dielectrics 107 and 108 are arranged between a plurality of laminated coils 109 which are arranged in the antenna coils 105 and 106, respectively. The laminated coils 109 are therefore insulated from each other.

The power transmission antenna may have a function of the power receiving antenna. The power receiving antenna may have a function of the power transmission antenna. The power transmission antenna and the power receiving antenna may have the same structure.

The dielectrics 107 and 108 are composed of a dielectric having a relative permittivity of 2 to 10 and a dielectric loss tangent of 0.01 or less. The dielectric is, for example, Teflon (registered trademark), polyethylene, polystyrene, polyimide, polyamide, fluorocarbon resin, acryl, or the like.

In the example embodiment, resonance antenna units are directly opposite to each other. The antenna arrangement is not limited to the above arrangement. An arrangement in which the resonance antenna units are not directly opposite to each other is allowed. The resonance antenna unit may deviate from a specific axis.

Operations of the underwater wireless power supply device 101 of the example embodiment is specifically explained below.

In the power transmission antenna 103, an alternating current power source (not shown) outputs alternating current power at a predetermined frequency. The outputted alternating current power is supplied to the antenna coil 105 in the power transmission antenna 103 from a power transmission terminal which is an input terminal of the power transmission antenna 103. A neighborhood electromagnetic field is generated in the good conductor medium 102 by the resonance operation of the antenna coil 105 in the power transmission antenna 103, and the power transmission antenna 103 starts wireless power transmission.

The power receiving antenna 104 resonates with the neighborhood electromagnetic field outputted from the power transmission antenna 103 by the resonance operation of the antenna coil 106 in the power receiving antenna 104, and receives the power transmitted from the power transmission antenna 103.

The electromagnetic field passing through the good conductor medium 102 suffers loss determined by the formula (1) with respect to the power transmission frequency determined by the resonance operation of the antenna coil 105 in the power transmission antenna 103 and the resonance operation of the antenna coil 106 in the power receiving antenna 104.

Finally the power inputted to the antenna coil 106 in the power receiving antenna 104 is supplied to a target load (e.g. battery, etc.) and the power transmission is completed.

In the first example embodiment, since the power transmission antenna and the power receiving antenna include a plurality of antenna coils, and a power transmission frequency is determined by the resonance operation of each antenna coil. A small-sized underwater wireless power supply device having the power transmission frequency less than 200 KHz can be realized.

Figure 2:
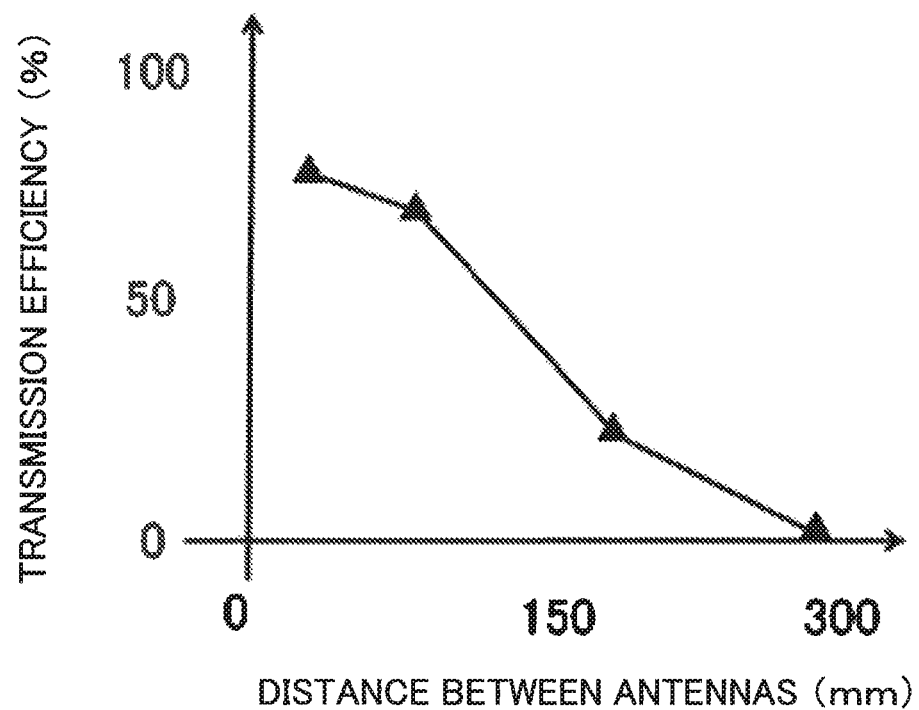
FIG. 2 is a graph illustrating relation between a distance between antennas and transmission efficiency in the antenna of the first example embodiment.

FIG. 2 is a graph illustrating results of measurement of the relation between a distance between the antennas and transmission efficiency in the antenna made on the basis of the example embodiment. In the example embodiment, the power transmission antenna and the power receiving antenna can be reduced to a size of 25 cm. As shown in FIG. 2, transmission efficiency of 70% or larger is obtained. As described above, that is because the power transmission frequency determined by the resonance operation of each of antenna coils is about 200 KHz.

Figure 3:
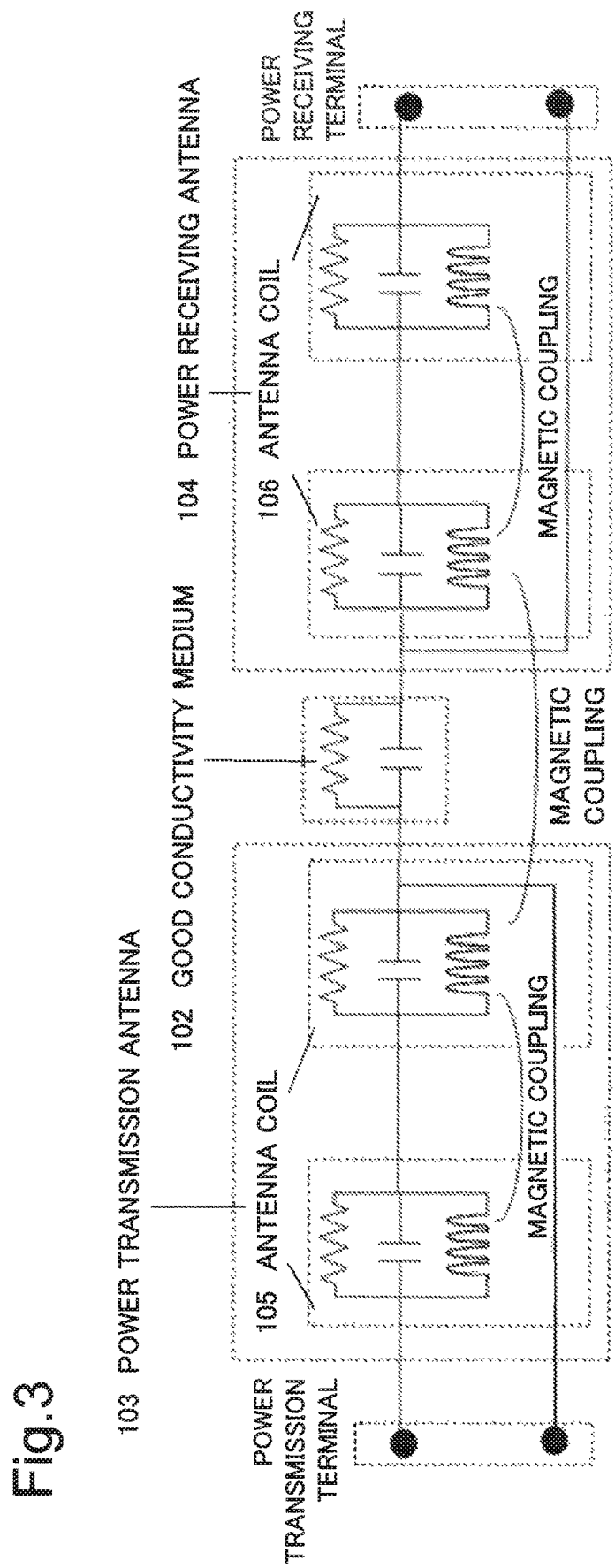
FIG. 3 is an equivalent circuit diagram of a power transmission antenna, a good conductor medium, and power receiving antenna at a resonance state.

The reason why the power transmission frequency is about 200 KHz in the example embodiment is explained below. FIG. 3 is an equivalent circuit diagram of a case in which the power transmission antenna, the good conductor medium, and the power receiving antenna are resonating. As shown in FIG. 3, antenna coils are coupled with a predetermined coupling coefficient. The resonance frequency of the power transmission antenna and the power receiving antenna can be described as the formula (2) by using a capacitive component C and an inductive component L of the power transmission antenna and the power receiving antenna, $$1/\sqrt{2\pi LC} \quad (2)$$

Therefore L or C has to be increased in order to reduce the resonance frequency. In the example embodiment, since two antenna coils are magnetically coupled each other, L becomes large and the resonance frequency is lowered. Consequently, even in seawater having a high conductivity, high transmission efficiency can be obtained.

In the example embodiment, since the dielectric has a waterproof function, a waterproof structure is not required and underwater wireless power transmission can be carried out at low cost.

Second Example Embodiment

Figure 4:
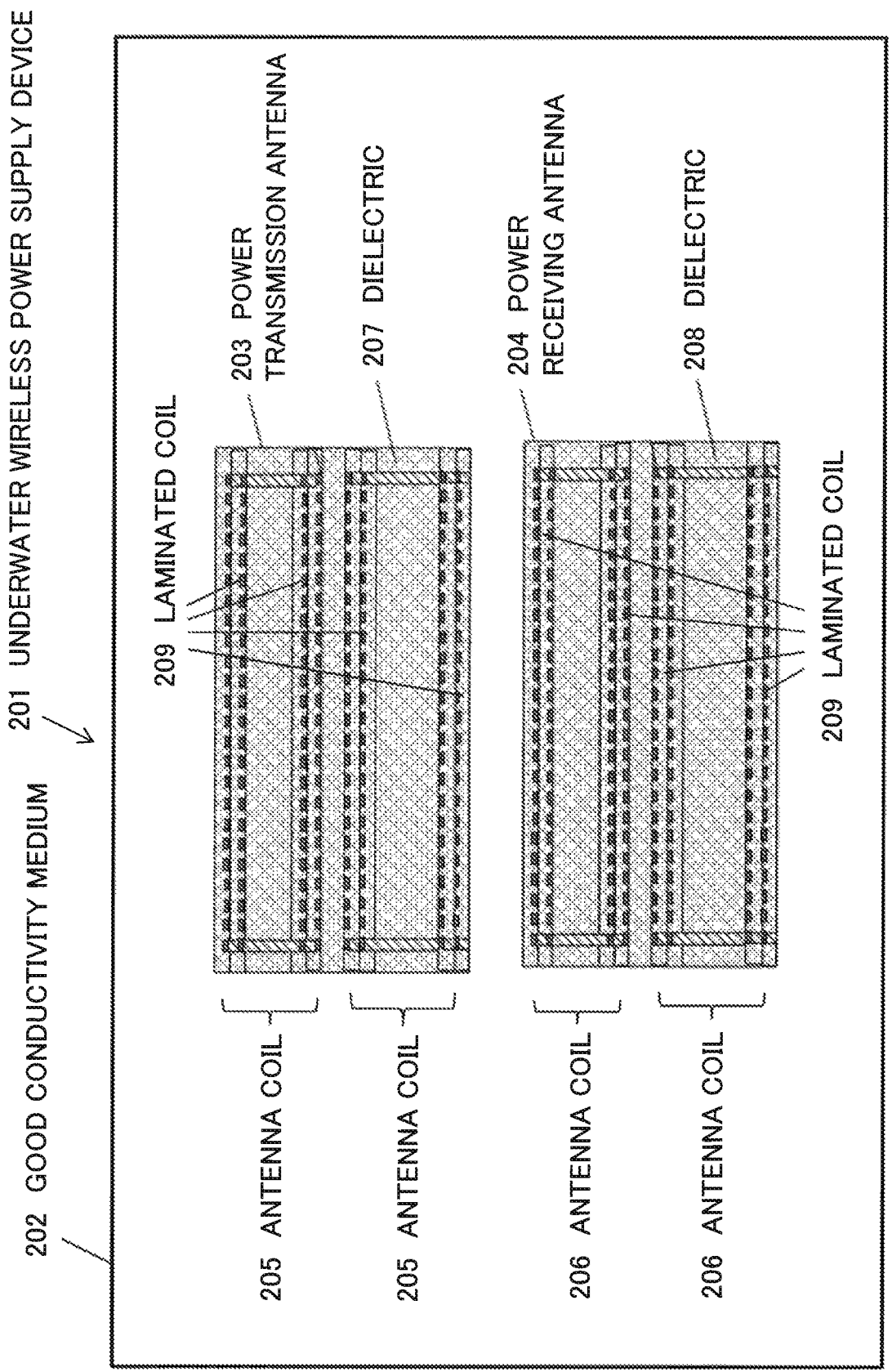
FIG. 4 is a diagram illustrating a structure of a wireless power supply device of a second example embodiment of the invention.

A wireless power supply device of a second example embodiment is described below by referring to drawings. FIG. 4 is a diagram illustrating a structure of a second example embodiment of the underwater wireless power supply device of the invention.

As shown in FIG. 4, in an underwater wireless power supply device 201 of the example embodiment, antenna coils 205 and 206 include a laminated coil 209, e.g. a helical coil or a spiral coil, which is multi-layered by using semiconductor processes, and layers are connected each other through via holes, or the like. The antenna coils 205 and 206 include a lamination structure having a plurality of laminated coils 209, desirably the lamination structure having the plurality of laminated coils 209 each having 3 to 20 layers. The plurality of laminated coils 209 are electrically connected each other through the via holes, and the other parts of the coils are electrically insulated each other. The underwater wireless power supply device 201 includes a power transmission antenna 203 and a power receiving antenna 204. The power transmission antenna 203 and the power receiving antenna 204 are located in a good conductor medium 202, e.g. seawater. The power transmission antenna 203 wirelessly transmits energy in the good conductor medium 202. The power receiving antenna 204 receives the energy transmitted from the power transmission antenna 203. The underwater wireless power supply device 201 resonates at the frequency determined by an impedance of the power transmission antenna 203, an impedance of the power receiving antenna 204 and an impedance of the good conductivity medium 202, and wirelessly transmits energy.

The power transmission antenna 203 includes the antenna coil 205 and a dielectric 207. The power receiving antenna 204 includes the antenna coil 206 and a dielectric 208.

The power transmission antenna may have a function of the power receiving antenna. The power receiving antenna may have a function of the power transmission antenna. The power transmission antenna and the power receiving antenna may have the same structure.

The dielectrics 207 and 208 are composed of a dielectric having a relative permittivity of 2 to 10 and a dielectric loss tangent of 0.01 or less. The dielectric is, for example, Teflon (registered trademark), polyethylene, polystyrene, polyimide, polyamide, fluorocarbon resin, acryl.

In the example embodiment, resonance antenna units are directly opposite to each other. The antenna arrangement is not limited to the above arrangement. An arrangement in which the resonance antenna units are not directly opposite to each other is allowed. The resonance antenna unit may deviate from a specific axis.

The specific operations of the underwater wireless power supply device 201 of the second example embodiment is the same as that of the first example embodiment.

The example embodiment has the effect of the first example embodiment. Further, in the example embodiment, the power transmission antenna and the power receiving antenna can be stably made at low cost. The antenna coils in the power transmission antenna and the power receiving antenna are made by copper wire, or the like. Since ordinary copper wire lacks flatness and is hard to bend, the antenna coils frequently malfunction. When the antenna coils include multilayer wiring which are made by semiconductor processes, the power transmission antenna and the power receiving antenna can be stably made at low cost.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

First Application Example of the Above Example Embodiments

Figure 5:
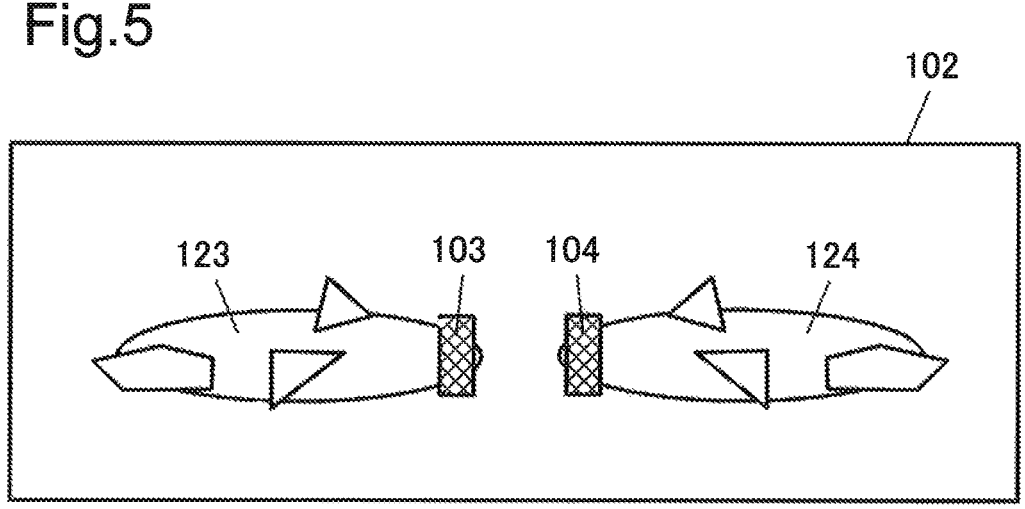
FIG. 5 is a schematic diagram of a first application example in which the invention is applied.

FIG. 5 is a schematic diagram of a first application example in which the invention is applied. The following application example is an application example in which the first example embodiment is applied. Further, any example embodiments may be applied to the following application example.

FIG. 5 illustrates the first application example in which the invention is applied to power supply from one submarine to another submarine. As shown in FIG. 5, submarines 123 and 124 include the power transmission antenna 103 and the power receiving antenna 104 of the first example embodiment. Initially the submarine 123 approaches the submarine 124 by using a communication means, or the like (not shown). The submarine 123 starts power transmission by using the power transmission antenna 103. The power receiving antenna 104 in the submarine 124 receives the power and batteries (not shown) arranged in the submarine 124 are charged. Finally if it is detected that the batteries are sufficiently charged, the submarine 124 sends a command to the submarine 123 by using a communication means and the power transmission antenna 103 stops power transmission.

Even if positions of the submarine 123 and the submarine 124 are shifted due to tidal current, the invention makes stable power supply possible.

The submarine 123 and the submarine 124 may use the power transmission antenna 103 as a power receiving antenna and may use the power receiving antenna 104 as a power transmission antenna. The submarine 123 and the submarine 124 may include both of the power transmission antenna 103 and the power receiving antenna 104. In the above structure, two-way power supply is possible.

The invention is not limited to the power supply between submarines. The invention may be applied to power supply from a submarine to a sensor device, having the power receiving antenna, which is arranged in ship or underwater. In the above structure, wireless power supply at a distance of 5 cm or longer becomes possible. Even though an electric power supply source with the power transmission antenna and a ship with the power receiving antenna roll or pitch due to tidal current, high power supply efficiency is obtained without precise ship control and collision. Since precise control is not required, a low cost system can be realized.

Second Application Example of the Above Example Embodiments

Figure 6:
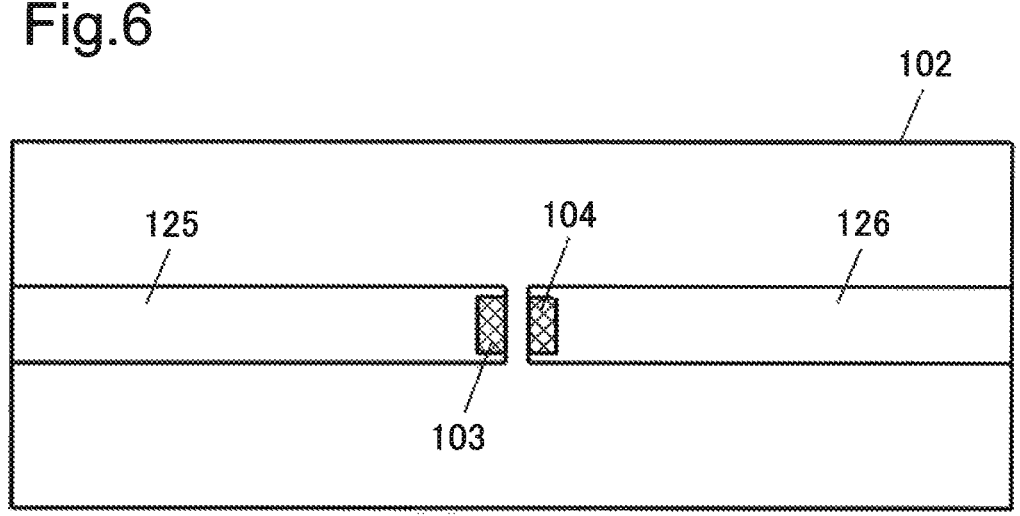
FIG. 6 is a schematic diagram of a second application example in which the invention is applied.
Figure 8:
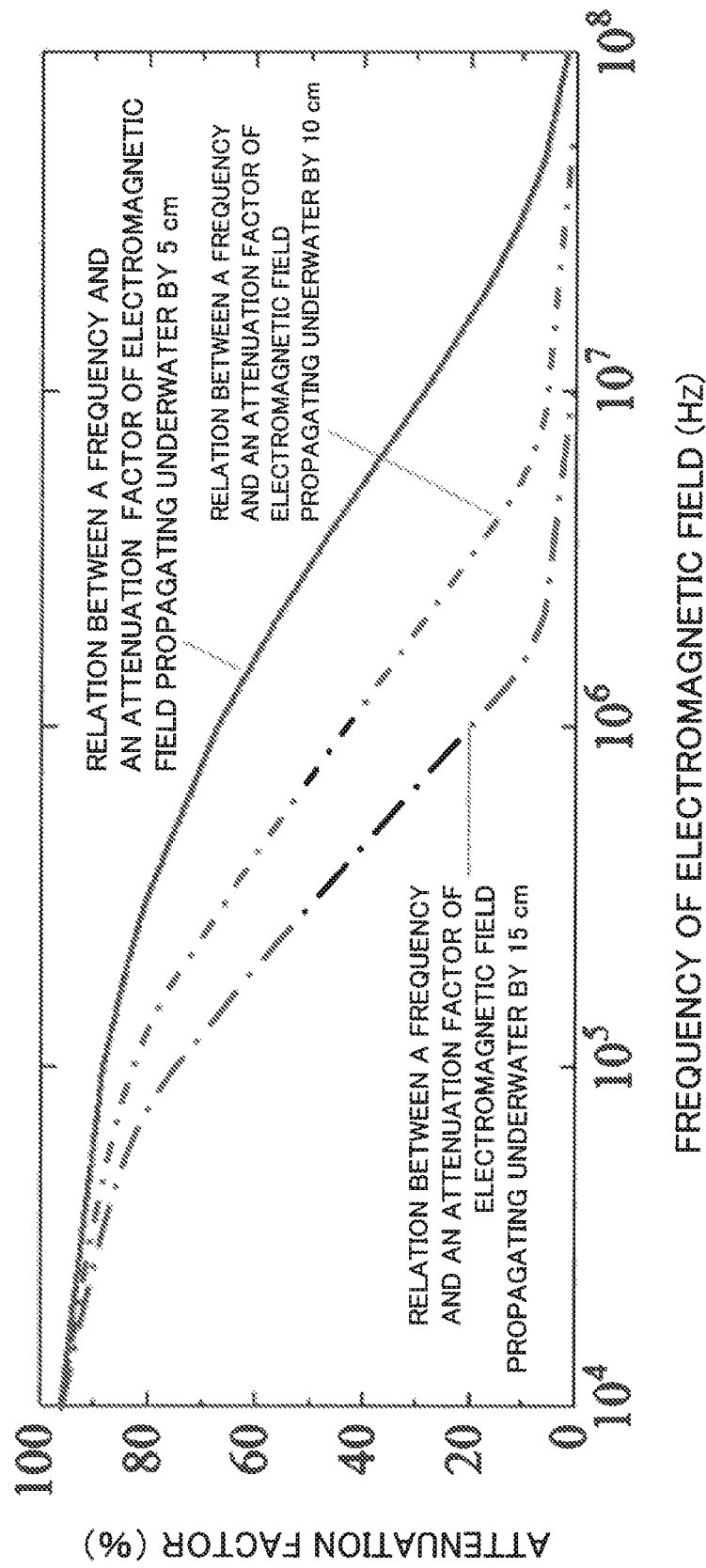
FIG. 8 is a graph illustrating a relation between a frequency and an attenuation factor of a magnetic field propagating underwater.

Another application example of the invention is explained. FIG. 6 is a schematic diagram of a second application example of the invention. FIG. 6 illustrates the first application example in which the invention is applied to a connection part of a power source cable which is laid underwater. A first power source cable 125 includes the power transmission antenna 103 and a second power source cable includes the power receiving antenna 104. The power source cable 125 starts power transmission by using the power transmission antenna 103. Next the power receiving antenna 104 arranged in the power source cable 126 receives the power. Finally when it is determined that power transmission is unnecessary, the power source cable stops the operation of the power transmission antenna 103.

By using the invention, wireless electric power supply can be carried out even underwater. Since noncontact connection between power source cables becomes possible, exchange of the power source cable is easy, wear does not occur, and reliability is improved. Precise connection works are not required, and wear deterioration due to attaching and detaching at a connection part does not occur. The system has high reliability since wear deterioration is decreased, and cost of the system is low since long term utilization is possible. Further since wireless electric power supply is possible, electric shock and current leakage do not occur when the power source cable is attached or detached.

The power source cable 125 and the power source cable 126 may use the power transmission antenna 103 as a power receiving antenna, and may use the power receiving antenna 104 as a power transmission antenna. The power source cable 125 and the power source cable 126 may have both of the power transmission antenna 103 and may the power receiving antenna 104. In the above structure, two-way electric power supply is possible.

INDUSTRIAL APPLICABILITY

The wireless power supply device of the invention can be used in a medium, for example, river water, fresh water, tap water, soil, and concrete, which has a conductivity which is $1 \times 10^{-4}$ S/m or higher and a relative permittivity which is higher than 1.

REFERENCE SIGNS LIST 101, 201 underwater wireless power supply device
102, 202 good conductivity medium
103, 203 power transmission antenna
104, 204 power receiving antenna
105, 106, 205, 206 antenna coil
107, 108, 207, 208 dielectric
109, 209 laminated coil
124 submarine
125, 126 power source cable

The invention claimed is:

1. A wireless power supply device that wirelessly transmits energy by resonating at a frequency determined by an impedance of a power transmission antenna that wirelessly transmits energy in a medium, an impedance of a power receiving antenna that receives energy transmitted from the power transmission antenna, and an impedance of the medium,
wherein:
each of the power transmission antenna and the power receiving antenna comprises at least two antenna coils and at least one dielectric arranged between the antenna coils, and
each of the antenna coils comprises at least two laminated coils and at least one dielectric arranged between the laminated coils.

2. The wireless power supply device of claim 1, wherein the antenna coils are composed of a helical coil or a spiral coil that is formed by using semiconductor processes.

3. The wireless power supply device of claim 1, wherein the medium has a conductivity higher than $1 \times 10^{-4}$ and a relative permittivity higher than 1.

4. The wireless power supply device of claim 1, wherein the medium is any one of seawater, river water, freshwater, tap water, soil, and concrete.

5. The wireless power supply device of claim 1, wherein the power transmission antenna is arranged in a submarine, the power receiving antenna is arranged in a sensor placed underwater, a ship or a submarine, and energy is wirelessly transmitted from the power transmission antenna to the power receiving antenna.

6. The wireless power supply device of claim 1, wherein the power transmission antenna is arranged in a first power source cable placed underwater, the power receiving antenna is arranged in a second power source cable placed underwater, and energy is wirelessly transmitted from the first power source cable to the second power source cable.

* * * * *